United States Patent [19]
Thomas

[11] Patent Number: 5,802,926
[45] Date of Patent: Sep. 8, 1998

[54] COLLAPSIBLE STEERING COLUMN ASSEMBLY

[75] Inventor: Robert M. Thomas, South Lyon, Mich.

[73] Assignee: Chrysler Corporation, Auburn Hills, Mich.

[21] Appl. No.: 822,968

[22] Filed: Mar. 21, 1997

[51] Int. Cl.⁶ ..................................................... B62D 1/19
[52] U.S. Cl. .............................. 74/493; 74/492; 280/775; 280/777
[58] Field of Search ..................... 74/492, 493; 280/775, 280/777, 779

[56] References Cited

U.S. PATENT DOCUMENTS

| 5,390,956 | 2/1995 | Thomas | 74/492 X |
| 5,497,675 | 3/1996 | Brown et al. | 280/777 X |
| 5,498,032 | 3/1996 | Thomas | 74/493 X |
| 5,509,325 | 4/1996 | Thomas | 74/493 |
| 5,609,063 | 3/1997 | Hedderly et al. | 280/777 X |
| 5,685,564 | 11/1997 | Iijima et al. | 74/492 X |

Primary Examiner—Charles A. Marmor
Assistant Examiner—Ankur Parekh
Attorney, Agent, or Firm—Lawrence J. Shurupoff

[57] ABSTRACT

An automotive vehicle steering column assembly includes an elongated collapsible steering column, a lower support for the lower end portion of the steering column and an upper support for the upper end portion of the steering column. The lower support comprises a bracket connected to vehicle support structure and constructed to absorb energy and guide movement of the lower end portion of the steering column when the steering column collapses in a frontal impact. The upper support comprises a swing unit for controlling the movement of the upper end portion of the steering column when it collapses. The swing unit comprises a lock mechanism including a rod slidable in a tubular housing. The rod is connected to the upper end portion of the steering column and can be locked in adjusted position within the housing depending on the tilt desired. A swing arm has one end portion rotatably received in a fixed mounting block, to which the housing of the lock mechanism is connected. A torque bar in the block has a non-rotatable connection to the first end of the swing arm to resist rotation thereof.

9 Claims, 4 Drawing Sheets

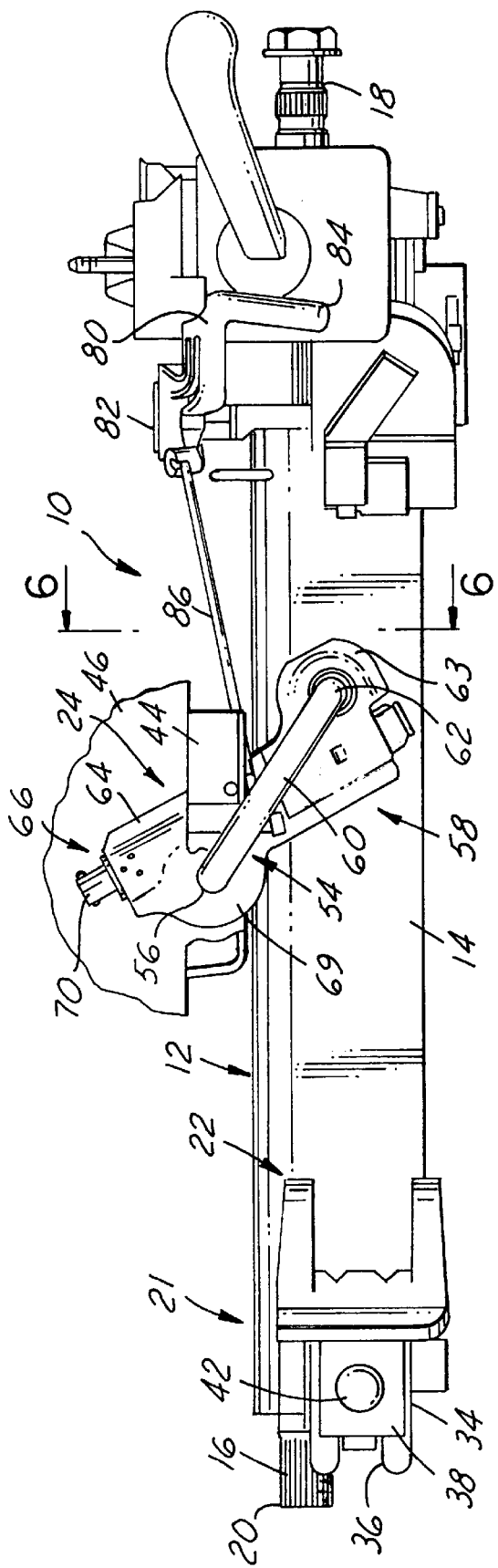
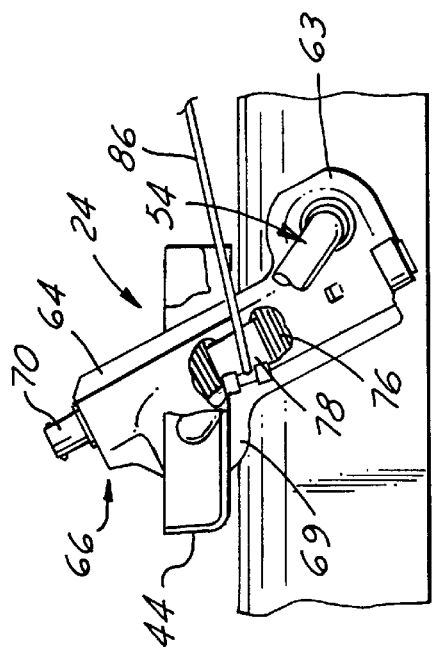
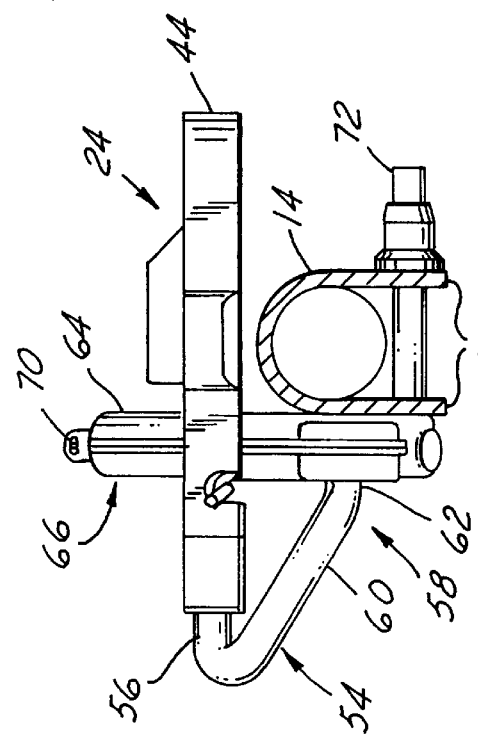
FIG.4
FIG.4A
FIG.6

COLLAPSIBLE STEERING COLUMN ASSEMBLY

FIELD OF INVENTION

This invention relates generally to steering columns for automotive vehicles and more particularly to a steering column which collapses with a controlled movement upon frontal impact.

BACKGROUND AND SUMMARY OF THE INVENTION

Collapsible steering columns are known in the industry and are designed to reduce injury to a driver in a frontal impact. There has been a need to guide the movement of the steering column when it collapses. A steering column assembly which satisfies this need is described in my prior U.S. Pat. No. 5,390,956 which is assigned to the assignee of this invention, and the disclosure of which is incorporated herein by reference.

In the prior patent, the lower end of the steering column is pivoted to an energy absorbing bracket. An upper support is provided for the upper end of the steering column, having a mounting block attached to vehicle support structure. A swing arm has a first end engaged with a torque bar anchored in the mounting block. The swing arm extends from the mounting block downward beneath the steering column. A second end of the swing arm extends up through the mounting block and pivots on the torque bar. The swing arm extends through the housing of a lock mechanism. The housing is attached to the steering column. Adjustments in the tilt of the steering column can be made by releasing the lock mechanism and adjusting the housing relative to the swing arm. The torsion bar is subject not only to torsion by reason of its connection to the first end of the swing arm, but also to bending and shear by reason of its pivotal connection to the opposite end of the swing arm. Moreover, the swing arm extends downward considerably below the steering column, sometimes providing a clearance problem. The swing arm causes the upper end portion of the steering column to move downwardly when the steering column collapses.

In accordance with the present invention, the second end of the swing arm, rather than being pivoted on the torque bar, is attached to the housing of the lock mechanism. The housing of the lock mechanism is pivoted to the first end of the swing arm, thus relieving the torque bar of any bending or shear stress. A rod within the housing of the lock mechanism is connected to the steering column and can be secured in adjusted position by the lock mechanism. The swing arm of the present invention preferably does not extend beneath the steering column and hence does not require the amount of clearance needed in prior constructions.

One object of this invention is to provide a steering column assembly having the foregoing features and capabilities.

Another object is to provide a steering column assembly which is composed of a relatively few simple parts, is rugged and durable in use, and is capable of being relatively inexpensively manufactured and assembled.

These and other objects, features and advantages of the invention will become more apparent as the following description proceeds, especially when considered with the accompanying drawings.

BRIEF DESCRIPTION OF THE DRAWINGS

FIG. 4 is a side elevational view of the steering column.

FIG. 4A is a fragmentary view showing a portion of FIG. 4, with parts broken away.

FIG. 6 is a sectional view taken on the line 6—6 in FIG. 4.

FIG. 7 is a top view of the mounting block of the upper support for the steering column, with parts in phantom.

DETAILED DESCRIPTION OF THE PREFERRING EMBODIMENT

Figure 1:
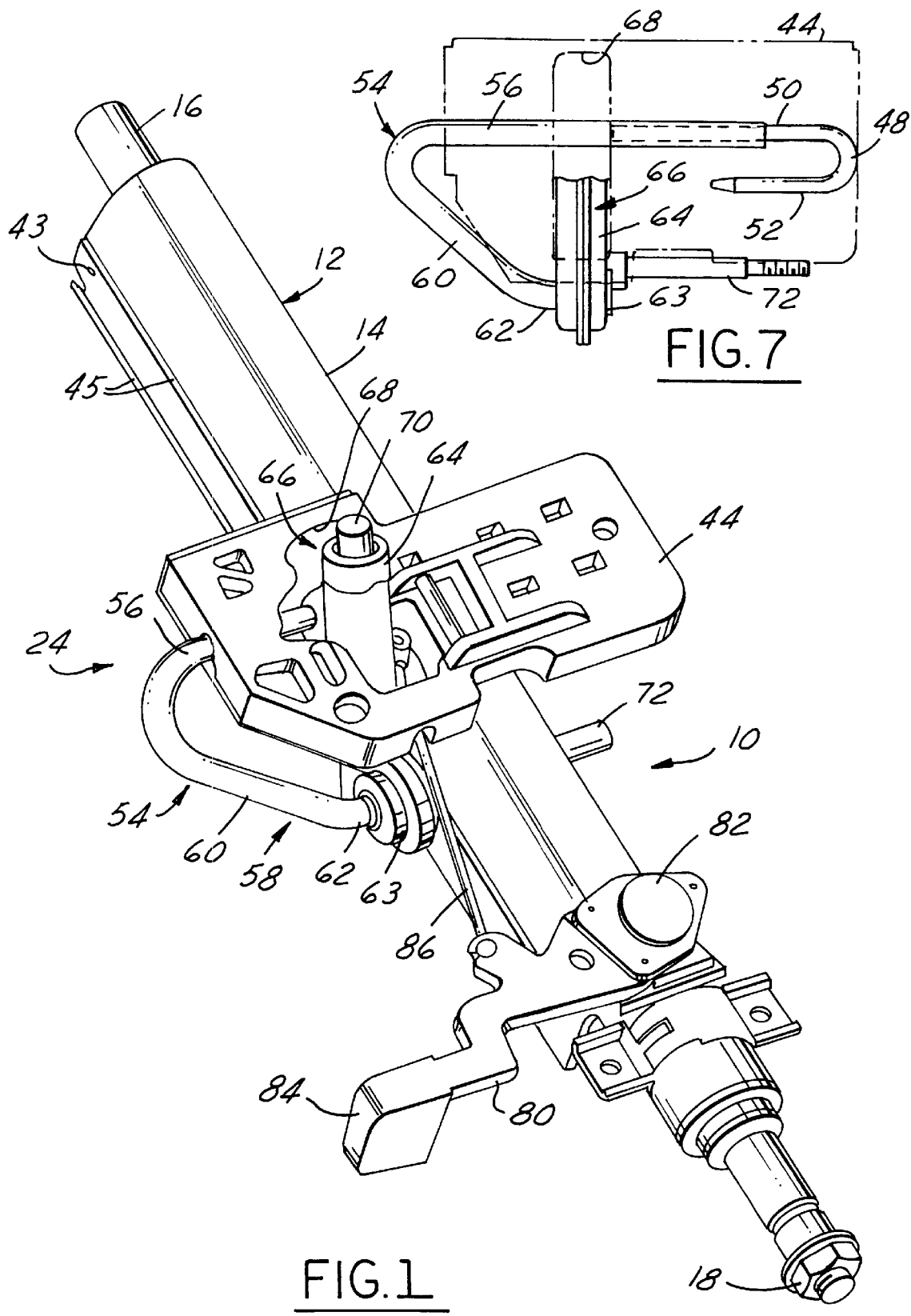
FIG. 1 is a perspective view of a steering column assembly constructed in accordance with the invention as seen from above, but omitting the lower mounting bracket seen in FIGS. 4 and 5.

Referring now more particularly to the drawings, there is shown a steering column assembly 10 for an automotive vehicle. The steering column assembly 10 comprises a steering column 12 which extends longitudinally of the vehicle, at a forward and downward tilt. The steering column comprises an elongated tubular jacket 14 and an elongated steering shaft 16 extending lengthwise within the jacket 14. The steering shaft 16 is adapted to have a steering wheel (not shown) on its upper end 18. The lower end 20 of the steering shaft is adapted to have a shaft coupler (not shown) for connection to a steering gear assembly for steering the wheels of the vehicle.

The steering column assembly 10 includes a lower support 21 for pivotally attaching and supporting a lower end portion of the steering column 12 to vehicle support structure, and an upper support 24 for connecting an upper end portion of the steering column to vehicle support structure.

The lower support 21 comprises a bracket 22 made of a flexible, resilient material such as steel and has side members 26 on opposite sides of the steering column 12 which are formed to provide loops 28 extending generally parallel to the steering column. The loops 26 are intended to unroll and absorb energy in the event of collapse of the steering column following a frontal impact. The steering column can be made to collapse under a predetermined load by adjusting or altering the width, height and/or radius of the loops.

The lower support bracket 22 has a mounting ear 30 extending laterally outwardly from one end of each of the loops 28 for attachment to vehicle support structure 32. The lower support bracket 22 also has a tongue 34 extending from each mounting ear 30 generally parallel to the side members 26 of the bracket. Each tongue has a slot 36 extending generally lengthwise thereof. Capsules 38 have grooves in the upper and lower edges thereof to slidably receive the material of the tongues 34 on opposite sides of the slots 36 therein. The capsules may, for example, be made of plastic and are preferably generally rectangular in shape.

A transverse pivot bolt 42 extends through central openings in the capsules 38 and the side members 26 and through holes 43 in the flanges 45 of the tubular jacket 14 of the steering column. The bolt pivotally attaches the steering column 12 to the lower support bracket 22. During a collision or frontal impact of a magnitude sufficient to cause collapse of the steering column, the steering column 12 will push forwardly on the pivot bolt 42, causing the loops 28 to bend and unroll and thereby absorb energy. The pivot bolt 42 remains fixed to the capsules which are guided by the slot 36 in the tongue 34 to control the direction of collapse of the steering column.

The upper support 24 comprises a mounting block 44 secured to vehicle support structure 46 in a position above the upper end of the steering column 12. A torque bar 48 is rigidly secured to the block 44. The torque bar is generally U-shaped, having horizontal, parallel legs 50 and 52 extending transversely, that is, generally perpendicular to the steering column. The torque bar 48 is made of a flexible, resilient material such as steel.

An elongated tubular swing arm 54 has one end portion 56 which is perpendicular to the steering column and extends rotatably into a passage in the mounting block 44 and telescopically receives at least a portion of the length of the leg 50 of the torque bar. The connection between the end portion 56 of the swing arm and the leg 50 of the torque bar is a non-rotatable connection so that leg 50 of the torque bar resists rotation of the swing arm. The swing arm 54 can rotate about the axis of its end portion 56, but this rotation is resisted by the torque bar 48, both legs of which are solidly anchored in the block 44. The swing arm is part of a swing unit 58 which controls the movement of the upper end portion of the steering column 12 when the steering column collapses, causing the upper end portion to move downwardly in an arc about the end portion 56 of the arm 54. Normally, the swing unit 58 resiliently holds the upper end portion of the steering column up in the position shown in FIG. 4.

The swing arm 54 has a mid-section 60 leading from the end portion 56 thereof downwardly and rearwardly as seen in FIG. 4, terminating in a second end portion 62 which is connected to a flange 63 on the lower end of an elongated housing 64 of a lock mechanism 66. The upper end portion of the housing 64 extends through an opening 68 in the mounting block 44 and has a flange 69 secured to the end portion 56 of the swing arm. The end portion 56 of the swing arm extends across the opening 68 and is perpendicular to the housing 64.

Figure 2:
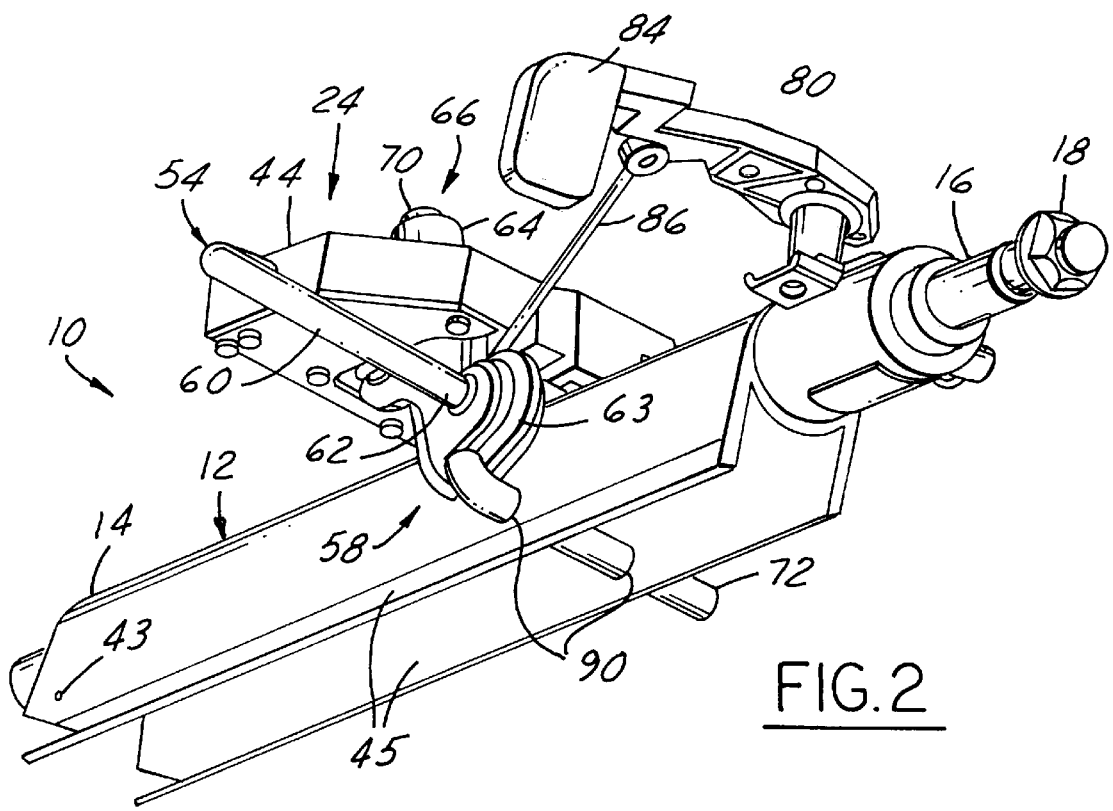
FIG. 2 is a perspective view of the steering column assembly as seen from below, also omitting the lower mounting bracket.
Figure 3:
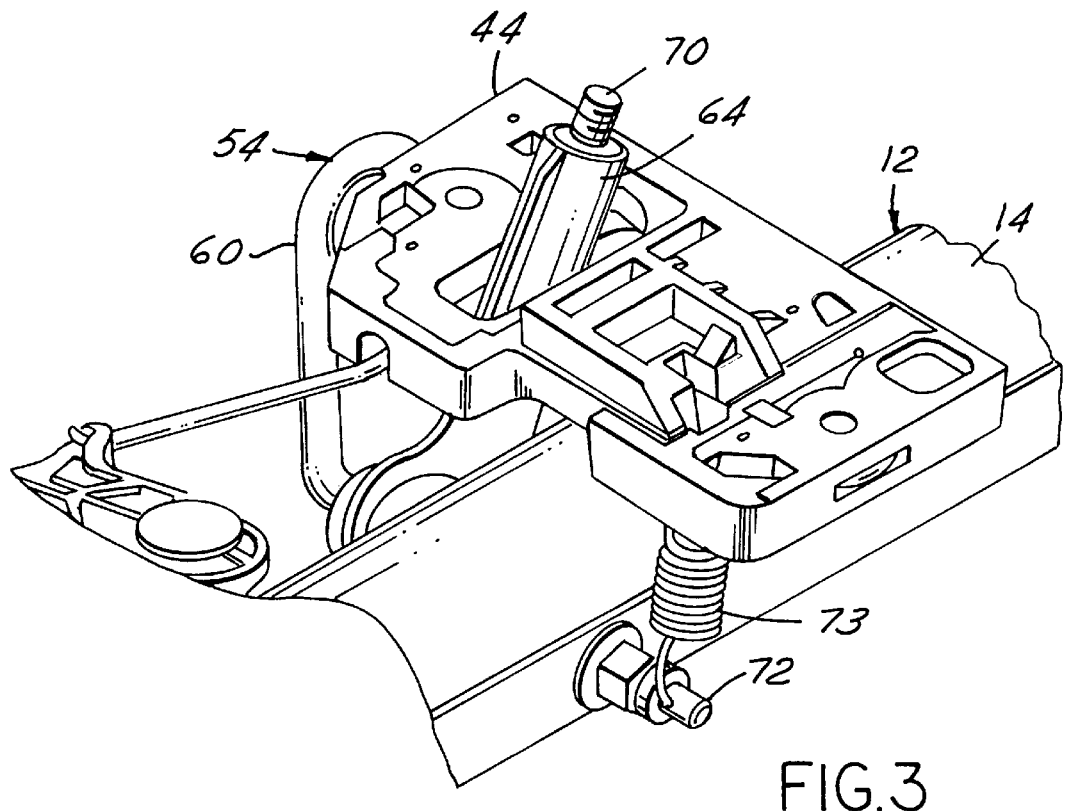
FIG. 3 is a fragmentary perspective view of a portion of the steering column as seen from above, but from a different angle than FIG. 1.
Figure 5:
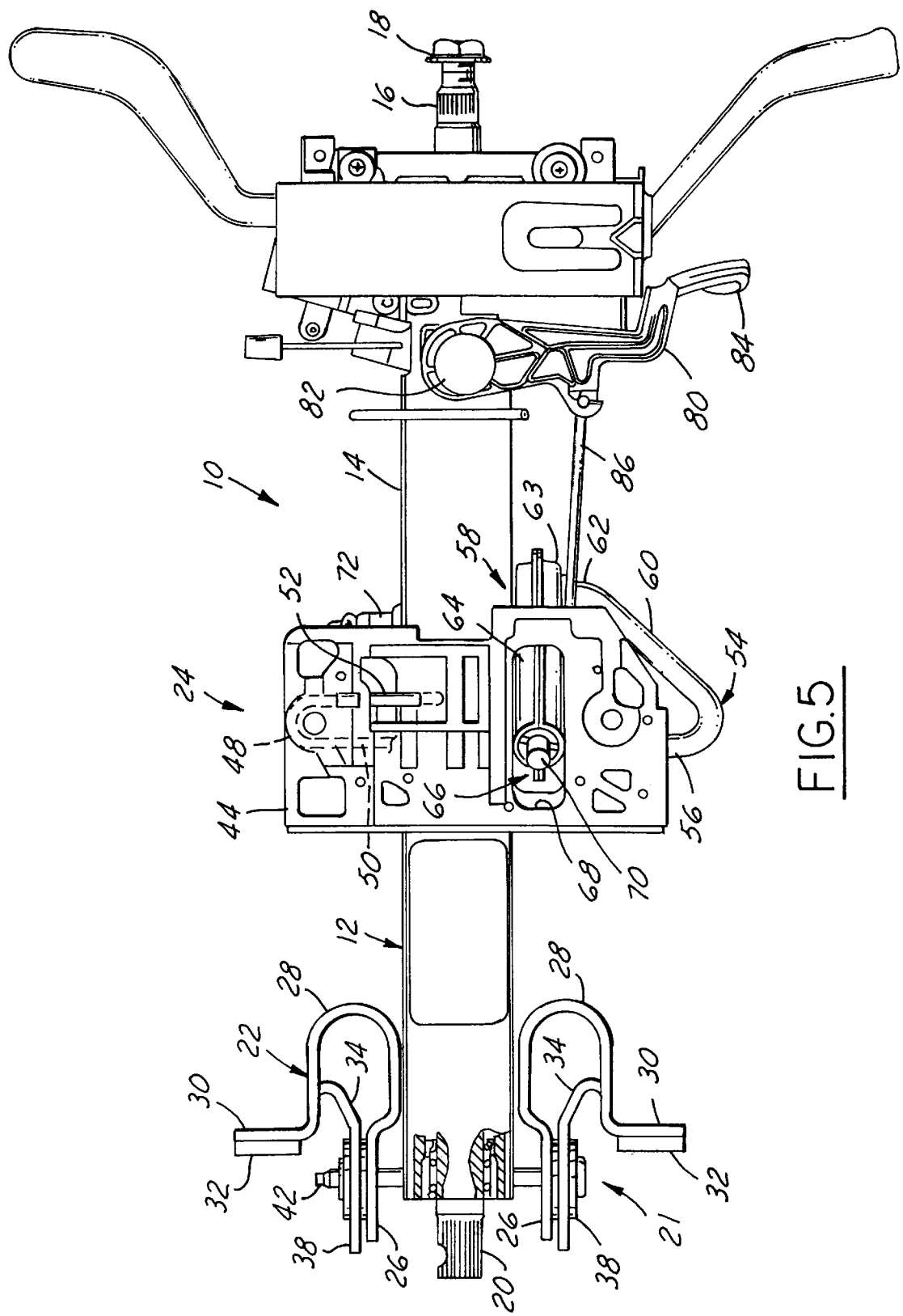
FIG. 5 is a top plan view of the steering column with parts in section.

A rod 70 is axially slidably mounted in the housing 64 of the lock mechanism 66. A pin 72 on the lower end of the rod forms a rigid right angle extension thereof and extends through the holes 90 (FIG. 2) in the parallel downwardly extending flanges 45 on the jacket 14 of the steering column to provide a connection between the rod and the steering column. A coil spring 73 (FIG. 3) between the pin 72 and the torsion bar leg 52 pulls up on the steering column 12 and thus cooperates with the torque bar 48 in resisting the downward and arcuate movement of the upper end portion of the steering column when the steering column is being used in a tilting motion by the driver.

The rod 70 is adapted to be locked in the housing 64 of the lock mechanism 66 in adjusted position to vary the tilt of the steering column. For this purpose, the lock mechanism has a double acting spring 76 within the housing 64 which surrounds the rod 70 and normally grips the rod to prevent it from moving axially, thereby locking it with respect to the housing. An actuating member 78 is connected to the spring 76 and may be rotated to release the spring and allow the rod to be adjusted axially within the housing. The lock mechanism 66 permits the normal tilt of the steering column to be raised or lowered by sliding the rod up or down in the housing and locking it in adjusted position. The lock 5 mechanism 66 is a commercially available product of P. L. Porter Co., ASG of Southfield, Mich.

The steering column assembly 10 includes a tilt release lever 80 for operating the actuating member 78 to release the lock mechanism 66 and allow a change in the tilt of the steering column. The tilt release lever has one end pivotally attached at 82 to the upper end portion of the jacket 14 of the steering column and may be manipulated by a handle 84 on the other end. A cable 86 has one end attached to a mid-portion of the tilt release lever so that by pivoting the tilt release lever counterclockwise in FIG. 1, the actuating member releases the spring 76 and allows the rod to be adjusted within the housing 64 of the lock mechanism and thus vary the tilt of the steering column. When the steering column is at a desired tilt, the tilt release lever is pivoted clockwise to cause the actuating member 78 to apply the spring 76 which re-grips the rod 70 and locks it from axial movement in the housing 64.

In the event of a frontal impact of sufficient magnitude to cause the steering column to collapse, the lower end of the steering column 12 will move forwardly in a path determined by the slots 36 in the tongues 34 of the lower support bracket 22 which guide the capsules 38. The upper end portion of the steering column will move in an arc about the end portion 56 of the swing arm 54 as a pivot axis downwardly and away from the driver as controlled by the swing unit 58.

What is claimed is:

1. An automotive vehicle steering column assembly including an elongated collapsible steering column having a lower end portion and an upper end portion, comprising a lower support for pivotally attaching the lower end portion of the steering column to vehicle support structure, an upper support for the upper end portion of the steering column, said upper support comprising a mounting block attachable to vehicle support structure, a swing unit for controlling the movement of the upper end portion of the steering column when it collapses comprising a lock mechanism including an elongated tubular housing having a first end portion and a second end portion, a rod slidable longitudinally within said housing, said housing having means for releasably locking said rod in a longitudinally adjusted position within said housing, means connecting said rod to the upper end portion of said steering column, a swing arm having a first end portion and a second end portion, said first end portion of said swing arm being rotatably received in said block, means connecting the first end portion of said swing arm to said first end portion of said housing, means connecting the second end portion of said swing arm to the second end portion of said housing, and a torque bar secured to said block having a non-rotatable connection to said first end portion of said swing arm.

2. An automotive steering column assembly as defined in claim 1, wherein said torque bar is generally U-shaped and has laterally spaced, parallel first and second legs extending transversely of the steering column, and said swing arm is tubular and said first end portion thereof telescopically receives said first leg of said torque bar with a non-rotatable connection.

3. An automotive vehicle steering column assembly as defined in claim 1, wherein said housing extends perpendicular to the first end portion of said swing arm.

4. An automotive vehicle steering column assembly as defined in claim 3, wherein said block has an opening therein, said first end portion of said swing arm has a part which extends across said opening, and said first end portion of the housing extends into said opening and is connected to the part of the first end portion of said swing arm which extends across said opening.

5. An automotive vehicle steering column assembly as defined in claim 4, wherein said block has means on opposite sides of said opening rotatably supporting said first end portion of said swing arm, and the first end portion of said housing is rigidly secured to said part of the first end portion of said swing arm.

6. An automotive vehicle steering column assembly as defined in claim 5, wherein said means connecting said rod to the upper end portion of said steering column comprises a pin secured to said rod and extending perpendicularly therefrom.

7. An automotive vehicle steering column assembly as defined in claim 6, and further including means for releasing said releasable locking means to permit longitudinal adjustment of said rod within said housing.

8. An automotive vehicle steering column assembly as defined in claim 7 wherein said lower support includes means for absorbing energy and guiding movement of the lower end portion of the steering column in a frontal impact.

9. An automotive steering column assembly as defined in claim 8, wherein said torque bar is generally U-shaped and has laterally spaced, parallel first and second legs extending transversely of the steering column, and said swing arm is tubular and said first end portion thereof telescopically receives said first leg of said torque bar with a non-rotatable connection.

* * * * *